(12) United States Patent
Suzuki et al.

(10) Patent No.: US 6,712,187 B2
(45) Date of Patent: Mar. 30, 2004

(54) CLUTCH ADJUSTMENT METHOD AND APPARATUS THEREOF

(75) Inventors: Kazuyuki Suzuki, Hirakata (JP); Shigeru Yamamoto, Hirakata (JP); Tomohiro Nakagawa, Hirakata (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 10/011,779

(22) Filed: Dec. 11, 2001

(65) Prior Publication Data

US 2002/0074201 A1 Jun. 20, 2002

(30) Foreign Application Priority Data

Dec. 15, 2000 (JP) .......................................... 200-382661

(51) Int. Cl.$^7$ ............................................. F16D 13/22
(52) U.S. Cl. ................................ 192/13 R; 192/111 R; 192/111 A; 180/6.7
(58) Field of Search ............................ 192/13 R, 18 A, 192/111 R, 111 A; 180/6.7, 6.48; 475/19; 477/174, 175, 176

(56) References Cited

U.S. PATENT DOCUMENTS

| | | | | |
|---|---|---|---|---|
| 4,266,648 A | * | 5/1981 | Martin | 192/85 AA |
| 4,372,408 A | * | 2/1983 | Chatterjea | 180/6.7 |
| 4,401,200 A | * | 8/1983 | Heidemeyer et al. | 477/176 |
| 4,529,072 A | * | 7/1985 | Oguma et al. | 477/176 |
| 4,646,891 A | * | 3/1987 | Braun | 477/175 |
| 4,702,358 A | * | 10/1987 | Mueller et al. | 192/13 R |
| 4,754,824 A | * | 7/1988 | Olsson | 180/6.48 |
| 5,325,933 A | * | 7/1994 | Matsushita | 180/6.7 |
| 6,260,642 B1 | | 7/2001 | Yamamoto et al. | 180/6.7 |
| 6,283,263 B1 | * | 9/2001 | Ibuki | 192/13 R |

FOREIGN PATENT DOCUMENTS

| | | |
|---|---|---|
| JP | A-8-214676 | 8/1996 |
| JP | A-2000-77618 | 6/2000 |

* cited by examiner

*Primary Examiner*—Charles A. Marmor
*Assistant Examiner*—Eric M. Williams
(74) *Attorney, Agent, or Firm*—Rader, Fishman & Grauer PLLC

(57) ABSTRACT

A clutch adjustment method and apparatus thereof are described which are capable of properly compensating for performance variations or performance deterioration due to variations or wear in various parts. The apparatus comprises: (a) adjustment mode setting means for setting an adjustment mode for adjusting clutch hydraulic pressure to a proper value, while brakes being in their actuated state; (b) clutch hydraulic pressure changing means for controlling the clutch hydraulic pressure to gradually change when the adjustment mode is set by the adjustment mode setting means; (c) clutch sliding start detecting means for detecting a start of sliding of a clutch; (d) clutch pressure command value detecting means for detecting a clutch pressure command value at the start of sliding of the clutch if sliding of the clutch is detected by the clutch sliding start detecting means while the clutch hydraulic pressure being gradually changed by the clutch hydraulic pressure changing means; and (e) clutch hydraulic pressure correcting means for correcting the clutch hydraulic pressure to a proper value, based on the clutch pressure command value detected by the clutch pressure command value detecting means.

7 Claims, 9 Drawing Sheets

(a)

(b)

CLUTCH ADJUSTMENT METHOD AND APPARATUS THEREOF

TECHNICAL FIELD

The present invention relates to a clutch adjustment method and apparatus thereof for making a steering clutch adjustment to ensure proper steering clutch performance in a tracklaying vehicle in which a right or left turn is made by controlling clutch hydraulic pressure and brake hydraulic pressure through operation of an electrical power-assisted steering lever.

BACKGROUND ART

In a known tracklaying vehicle such as bulldozers, the clutch and brake attached to each of the right and left drive wheels are controlled to effect right and left turns of the vehicle. More specifically, if the steering lever is operated in either the right or left steering direction during traveling of the vehicle, the clutch on the side to which the steering lever has been operated is released from its engaged state, while the brake on the same side is actuated in the braking direction with the crawler belt only on this side being brought to a stop, so that the vehicle turns in the desired direction.

The so-called electronically controlled steering systems come into common use for providing clutch and brake control. Such a steering system includes (i) an electrical power-assisted steering lever, (ii) a steering command signal generator for issuing a steering command signal in accordance with the operating amount of the steering lever and (iii) an electronic proportional control valve controlled based on the output from the steering command signal generator, and controls the clutches and brakes through control of the electronic proportional control valve.

The electronically controlled steering systems present the bothersome drawback that if variations in vehicle performance occur owing to variations in the constituents (e.g., solenoids and springs) of the control valves or variations in the thickness of the clutch disks or brake disks, mechanical adjustments (e.g., shim adjustment and stroke adjustment) have to be carried out as required whenever they occur. This steering system suffers from another problem that long use of the vehicle leads to wear etc. of the steering system including the steering brakes and steering clutches, resulting in degradation of vehicle performance.

For constantly providing desired proper steering brake or steering clutch performance to overcome the forgoing problems, it is necessary to incorporate a system which enables a brake or clutch adjustment at the time of delivery or check of a vehicle.

There is known a steering brake adjustment method carried out in the following procedure.

Step 1: A crawler belt is lifted from the ground by use of implements (blade and ripper) or jacks.

Step 2: Engine rotation is set to a low idling state.

Step 3: An adjustment mode is set.

Step 4: The crawler belt is rotated with the transmission placed in the third forward speed range (F3).

Step 5: The test starting switch is turned on. At that time, a test current flows to the brake solenoid for a specified period of time and after the elapse of the specified time, the speed of the crawler belt returns to a normal speed.

Step 6: The adjuster makes a check as to whether or not the crawler belt stopped before the speed of the crawler belt returned to the normal speed. Then, if it is determined the crawler belt stopped, the adjuster makes a check again with an increased setting of hydraulic pressure to determine whether the crawler belt stops.

Step 7: If the crawler belt did not stop before returning to the normal speed, the adjuster makes a check again with a decreased setting of hydraulic pressure to determine whether the crawler belt stops. Checks are made in this way and when the crawler belt stops, the adjustment mode is ended.

There exist no prior examples of tracklaying vehicles having the above-described electronically controlled steering system in which a steering clutch adjustment function is incorporated, and, therefore, there has been long awaited development of an adjustment system which enables desired proper steering clutch performance.

The present invention is directed to overcoming the foregoing problems and a prime object of the invention is therefore to provide a clutch adjustment method and apparatus thereof, which make it possible to adequately compensate for variations in performance as well as degradation of performance due to variations or wear in various parts.

DISCLOSURE OF THE INVENTION

The above object can be achieved by a clutch adjustment method according to a first aspect of the invention. The method is adapted for use with a tracklaying vehicle wherein right and left drive wheels are each provided with a clutch and a brake and wherein clutch hydraulic pressure and brake hydraulic pressure are controlled by operation of an electrical power-assisted steering lever to allow a right or left turn of the vehicle, the method being made such that when an adjustment mode is selected with the brakes in their actuated state, a command value for the clutch hydraulic pressure at the start of sliding of a clutch is detected while the clutch hydraulic pressure being gradually changed, and an adjustment for the clutch is made based on the detected command value.

According to the invention, for clutch adjustment, the adjustment mode is set with the brakes in their actuated state and clutch hydraulic pressure is gradually varied (e.g., increasing) during the adjustment mode. Then, a command value of clutch hydraulic pressure at the start of sliding of a clutch being adjusted is detected and according to this command value, a clutch adjustment is carried out. With this arrangement, variations due to different adjusters are avoided and sliding of the clutch is minimized, so that an adjustment can be automatically made to ensure adequate clutch performance. This adjustment can be carried out when no implements are mounted on the front and rear sides of the vehicle. In addition, even if sliding of the clutch being adjusted occurs, the vehicle does not move because the brakes are in their actuated state so that the clutch hydraulic pressure can be properly corrected.

According to a second aspect of the invention, there is provided a clutch adjustment apparatus adapted for use with a tracklaying vehicle wherein right and left drive wheels are each provided with a clutch and a brake and wherein clutch hydraulic pressure and brake hydraulic pressure are controlled by operation of an electrical power-assisted steering lever to allow a right or left turn of the vehicle, the apparatus comprising, as shown in the general block diagram of FIG. 1, (a) adjustment mode setting means 1 for setting an adjustment mode for adjusting the clutch hydraulic pressure to a proper value, while the brakes being in their actuated state;

(b) clutch hydraulic pressure changing means 2 for controlling the clutch hydraulic pressure to gradually change when the adjustment mode is set by the adjustment mode setting means 1;

(c) clutch sliding start detecting means 3 for detecting a start of sliding of a clutch;

(d) clutch pressure command value detecting means 4 for detecting a clutch pressure command value at the start of sliding of the clutch, if sliding of the clutch is detected by the clutch sliding start detecting means 3 while the clutch hydraulic pressure being gradually changed by the clutch hydraulic pressure changing means 2; and (e) clutch hydraulic pressure correcting means 5 for correcting the clutch hydraulic pressure to a proper value, based on the clutch pressure command value detected by the clutch pressure command value detecting means 4.

The second aspect of the invention is associated with an apparatus which implements the clutch adjustment method of the first aspect. For starting clutch adjustment, the adjustment mode is set by the adjustment mode setting means 1 while the brakes are in their actuated state. In this adjustment mode, the clutch hydraulic pressure is gradually changed (e.g., increasing) by the clutch hydraulic pressure changing means 2. If a start of sliding of the clutch is detected by the clutch sliding start detecting means 3 during the changing of the clutch hydraulic pressure, a command value of clutch hydraulic pressure at the start of sliding of the clutch is detected by the clutch pressure command value detecting means 3 and based on the detected command value, the clutch hydraulic pressure correcting means 5 corrects the clutch hydraulic pressure so as to have a proper value. This arrangement provides the same effect as obtained by the first aspect of the invention and is particularly advantageous in that since the sliding start condition of the clutch is automatically detected by the clutch sliding start detecting means 3, variations attributable to different adjusters can be avoided so that anybody can make an adjustment with ease.

Preferably, the apparatus of the second aspect of the invention is modified such that the clutch hydraulic pressure correcting means 5 corrects the clutch hydraulic pressure based on the difference between a reference clutch pressure command value corresponding to a specified tractive force of the vehicle and the clutch pressure command value detected by the clutch pressure command value detecting means 4 (a third aspect of the invention). With this arrangement, a proper clutch hydraulic pressure command value can be determined based on the tractive force so that a clutch hydraulic pressure closer to the hydraulic pressure at the time of clutch sliding can be effectively obtained, without being affected by variations in other parts (e.g., engine and power line) than the steering section.

Preferably, the apparatus of the second aspect of the invention is modified as follows: the clutch sliding start detecting means 3 is a transmission output-side rotation sensor for detecting the rotation of the output-side of the transmission of the vehicle, and the adjustment mode setting means sets the adjustment mode such that the clutch to be unadjusted is disengaged at all times, when each brake is constantly actuated and the electrical power-assisted steering lever has been shifted to the side of the clutch to be adjusted (a fourth aspect of the invention). With this arrangement, the hydraulic pressure at the start of sliding of the clutch can be easily and accurately detected. In addition, since the clutch to be unadjusted is in its disengaged state at all times, the vehicle does not move during the sliding of the clutch being adjusted.

The apparatus according to the second aspect of the invention may be modified such that the clutch hydraulic pressure changing means provides a step-wise increase in a specified amount in the clutch hydraulic pressure at specified time intervals, starting from a preset initial value (a fifth aspect of the invention). With this arrangement, a clutch hydraulic pressure command value at the start of sliding of the clutch can be readily and accurately obtained.

It is preferable to modify the fourth aspect of the invention such that the clutch hydraulic pressure correcting means 5 corrects the clutch hydraulic pressure based on the difference between a reference clutch pressure command value corresponding to a specified tractive force of the vehicle and the clutch pressure command value detected by the clutch pressure command value detecting means 4 (a sixth aspect of the invention).

The fifth aspect of the invention is preferably modified such that the clutch hydraulic pressure correcting means 5 corrects the clutch hydraulic pressure based on the difference between a reference clutch pressure command value corresponding to a specified tractive force of the vehicle and the clutch pressure command value detected by the clutch pressure command value detecting means 4 (a seventh aspect of the invention).

BEST MODE FOR CARRYING OUT THE INVENTION

Referring now to the accompanying drawings, a clutch adjustment method and apparatus thereof will be described according to a preferred embodiment of the invention.

Figure 1:
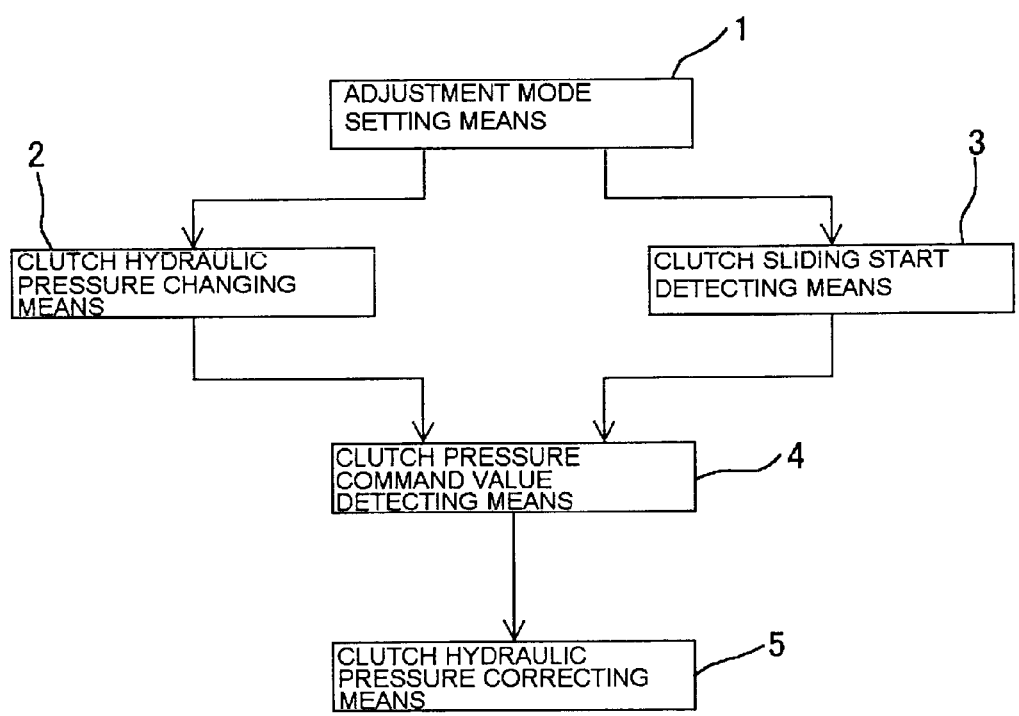
FIG. 1 is a general block diagram of a clutch adjustment apparatus associated with a second aspect of the invention.
Figure 2:
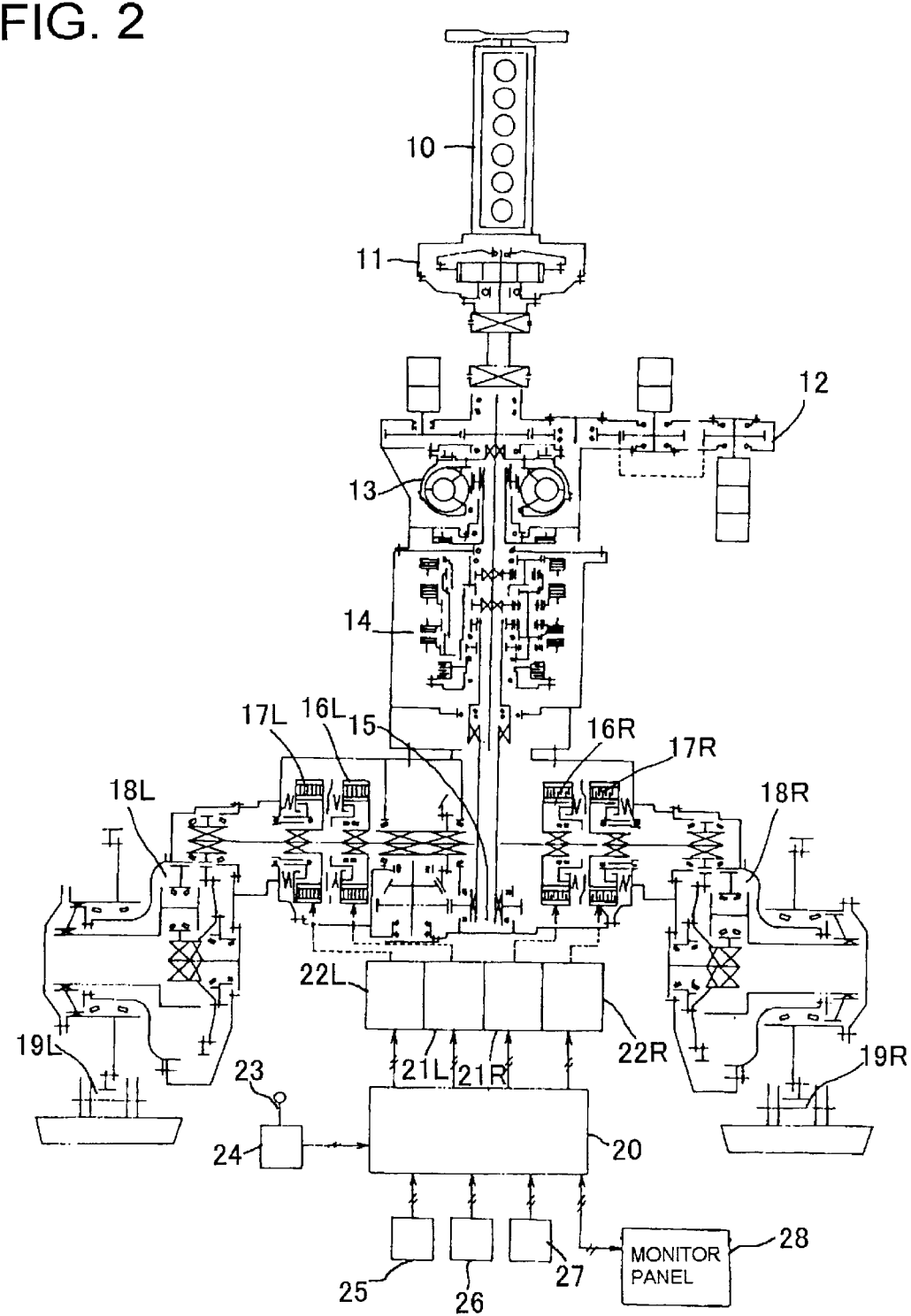
FIG. 2 is a system structural diagram of a clutch adjustment apparatus according to one embodiment of the invention.

FIG. 2 shows a system structural diagram of a clutch adjustment apparatus constructed according to one embodiment of the invention. The apparatus of this embodiment is one applied to a bulldozer.

In the bulldozer according to the present embodiment, a rotative driving force from an engine 10 is transmitted to a torque converter 13 through a damper 11 and a PTO 12 and then transmitted from the output shaft of the torque converter 13 to a transmission 14 which is, for example, a planetary gear wet-type multi-plate clutch transmission having an input shaft coupled to the output shaft of the torque converter 13. This transmission 14 includes a forward drive clutch, a reverse drive clutch, and first to third speed clutches. The rotative driving force from the output shaft of the transmission 14 is transmitted to a right and left pair of final reduction gears 18R, 18L through a transfer 15, right and left steering clutches 16R, 16L and right and left brakes 17R, 17L, whereby sprockets 19R, 19L for running crawler belts (not shown) are driven.

The clutches 16R, 16L and the brakes 17R, 17L are designed to be actuated by the energizing force of springs and released by hydraulic pressure, and controlled by a right clutch solenoid proportional control valve 21R, a left clutch solenoid proportional control valve 21L, a right brake solenoid proportional control valve 22R and a left brake solenoid proportional control valve 22L, respectively, in response to a control signal output from a controller 20.

Input to the controller 20 is a signal from a steering command signal generator 24 which issues a steering command signal according to the operation amount of a steering lever (mono lever) 23. This steering lever 23 also serves as a gear shift lever for forward and backward drives. Apart from the signal from the generator 24, the controller 20 inputs other data such as rotational speed data on the engine 10 from an engine rotation sensor 25; rotational speed data on the output shaft of the transmission 14 from a transmission output shaft rotation sensor 26 (which corresponds to the transmission output-side rotation sensor of the present invention); and data on the speed range state of the transmission 14 from a transmission speed range sensor 27. Connected to the controller 20 is a touch-panel-type monitor panel 28 serving as a display device for showing data to the operator.

Figure 3:
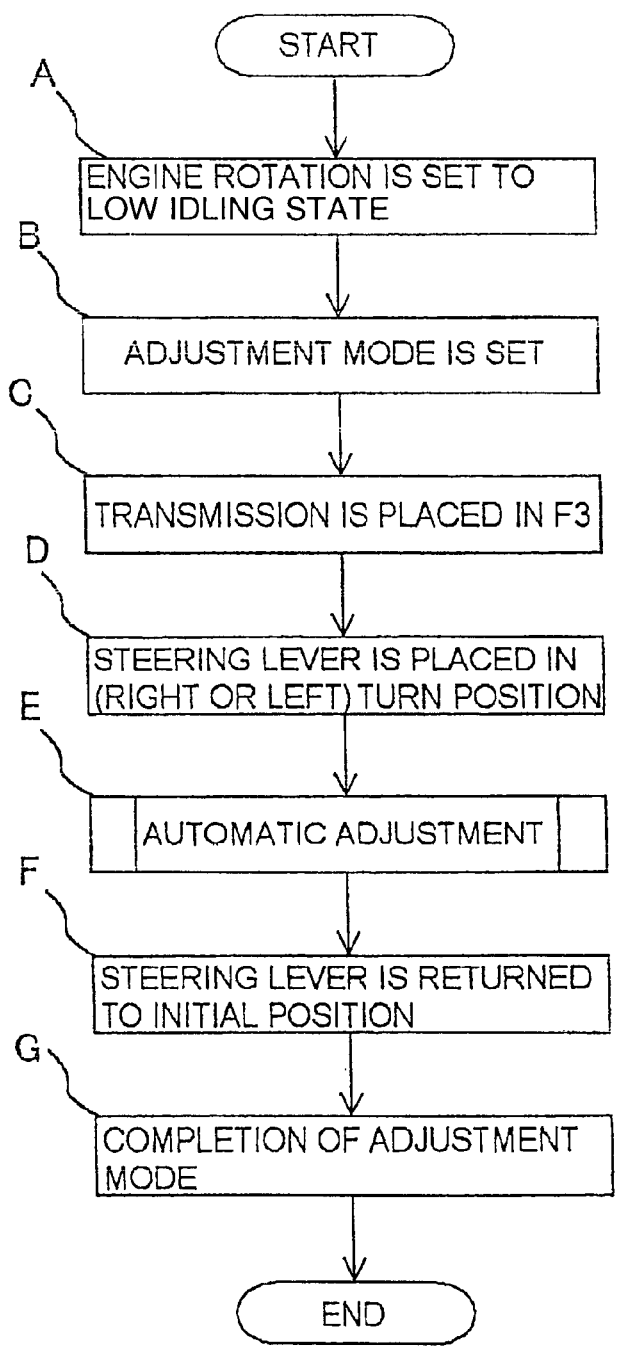
FIG. 3 is a flow chart of a process of adjusting a clutch.

Reference is made to the flow chart of FIG. 3 to describe a process for clutch adjustment according to the present embodiment.

Step A: For making a clutch adjustment, the engine 10 is first started with the rotational speed of the engine 10 set to a low idling state, while the right and left brakes 17R, 17L being actuated, in other words, while control signals sent to the right and left brake solenoid proportional control valves 22L, 22R being cut off.

Step B: Then, the adjustment mode is set (selected). A concrete setting process for the adjustment mode will be described later.

Step C: The transmission 14 is placed in the forward third speed range (F3).

Step D: The steering lever 23 is sifted in a turning direction (right or left) to the side clutch adjustment is to be carried out. At that time, a command signal for instructing automatic clutch adjustment is generated to be input to the controller 20. It should be noted that the clutch (to be unadjusted) on the side opposite to the side (i.e., adjustment side) to which the steering lever 23 has been shifted is kept in its disengaged state at all times.

Step E: An automatic adjustment for the clutch is carried out by the controller 20. This automatic adjustment will be described later in detail with reference to the flow chart of FIG. 4.

Step F: After completion of the automatic adjustment, a caution buzzer buzzes to inform the adjuster of the completion of the adjustment. Upon receipt of the information, the adjuster puts the steering lever 23 back to the initial neutral position. It should be noted that if an adjustment for the right clutch has been carried out by shifting the steering lever 23 to the right hand, the steering lever 23 is then shifted to the left thereby to make an adjustment for the left clutch.

Step G: The adjustment mode is completed.

Figure 4:
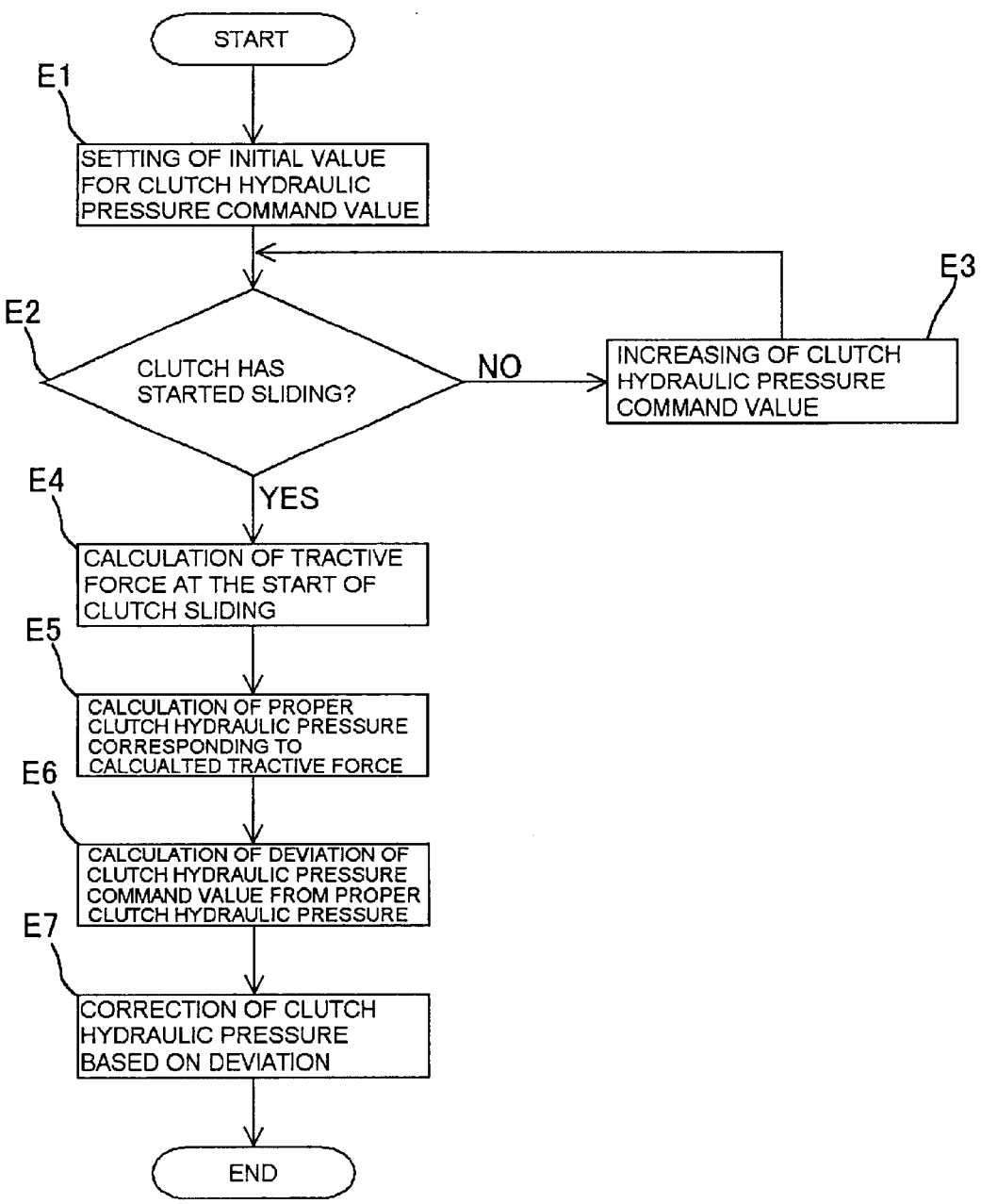
FIG. 4 is a flow chart of a control process for automatic adjustment.

Next, the control process for the automatic adjustment mentioned at Step E will be described with reference to the flow chart of FIG. 4.

Step E1: An initial command value of clutch hydraulic pressure is set. As this initial setting, a preset value which is lower than an adequate clutch hydraulic pressure (described later) is used.

Step E2: A check is made to determine whether or not the clutch has started sliding by judging if an input signal from the transmission output shaft rotation sensor 26 becomes equal to or more than a specified threshold value. If sliding of the clutch is detected, the program then proceeds to Step E4 and if sliding is undetected on the other hand, the program proceeds to Step E3.

Figure 5:
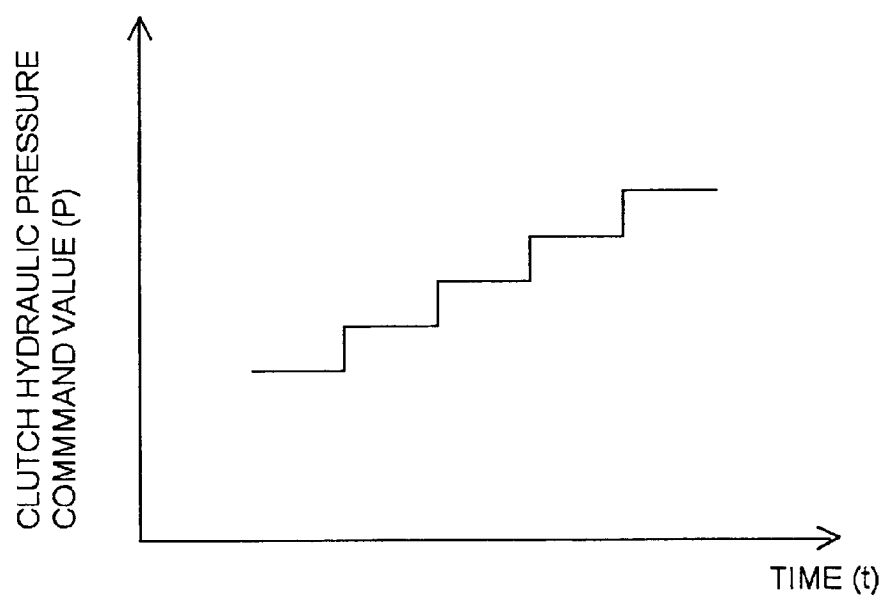
FIG. 5 is a graph of changes in the command value of clutch hydraulic pressure.

Step E3: The clutch hydraulic pressure command value is increased. In this case, a clutch hydraulic pressure command value, which is step-wise increased at specified time intervals as shown in FIG. 5, is used. After increasing the clutch hydraulic pressure command value, it is determined again in Step E2 whether the clutch has started sliding.

Step E4: If the clutch has started sliding, the tractive force F of the vehicle at the start of sliding of the clutch is calculated. This tractive force F is obtained in such a way that engine torque is obtained from rotational speed data on the engine 10 sent from the engine rotation sensor 25 and this engine torque is multiplied by the reduction ratio between the speed of the output shaft of the torque converter 13 and that of the sprocket 19R or 19L and further multiplied by the diameter of the sprocket 19R or 19L.

Figure 6:
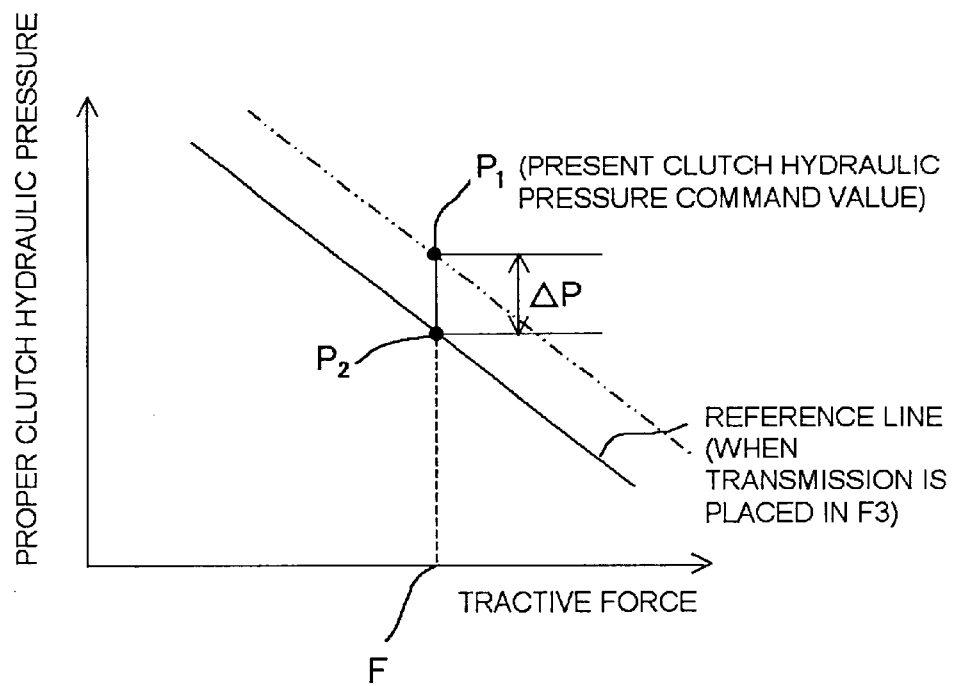
FIG. 6 is a graph showing the relationship between proper clutch hydraulic pressure and tractive force.

Step E5: A reference line of proper clutch hydraulic pressure characteristics for tractive force (when the transmission is placed in F3) as indicated by solid line of FIG. 6 is stored in the controller 20 beforehand. Based on this reference line, a proper clutch hydraulic pressure $P_2$ for the tractive force F is calculated, using the tractive force F obtained at the preceding step.

Step E6: Calculation is done to obtain the deviation $\Delta P$ of the clutch hydraulic pressure command value (commanded clutch hydraulic pressure) $P_1$ at the start of sliding of the clutch from the proper clutch hydraulic pressure obtained at the preceding step.

Step E7: The deviation $\Delta P$ thus obtained is stored in the controller 20 and the reference line is corrected based on the value $\Delta P$, thereby obtaining the line indicated by two-dot chain line of FIG. 6. Upon completion of the adjustment, the caution buzzer buzzes to inform the adjuster of the completion of the adjustment.

The clutch hydraulic pressure deviation to be compensated for ($\Delta P$) can be thus easily obtained, and with this value, the clutch hydraulic pressure is automatically corrected so that an accurate clutch adjustment can be easily and reliably carried out without causing variations due to different adjusters. According to the adjustment method of the present embodiment, even if sliding occurs in the clutch being adjusted, the vehicle does not move so that the clutch hydraulic pressure command value at the start of sliding of the clutch can be detected and the clutch hydraulic pressure can be corrected to an adequate value in accordance with the detected value.

The adjustment operation can be carried out without the implements being mounted on the vehicle and in addition, the adjustment can be made with sliding of the clutch being minimized, which obviates the risk of adverse effects on the clutch. Further, not only the clutch hydraulic pressure command value at the start of sliding of the clutch but also tractive force is detected for correction, and therefore, the clutch hydraulic pressure can be properly corrected without being affected by other parts such as the engine and power line than the steering system.

Figure 7:
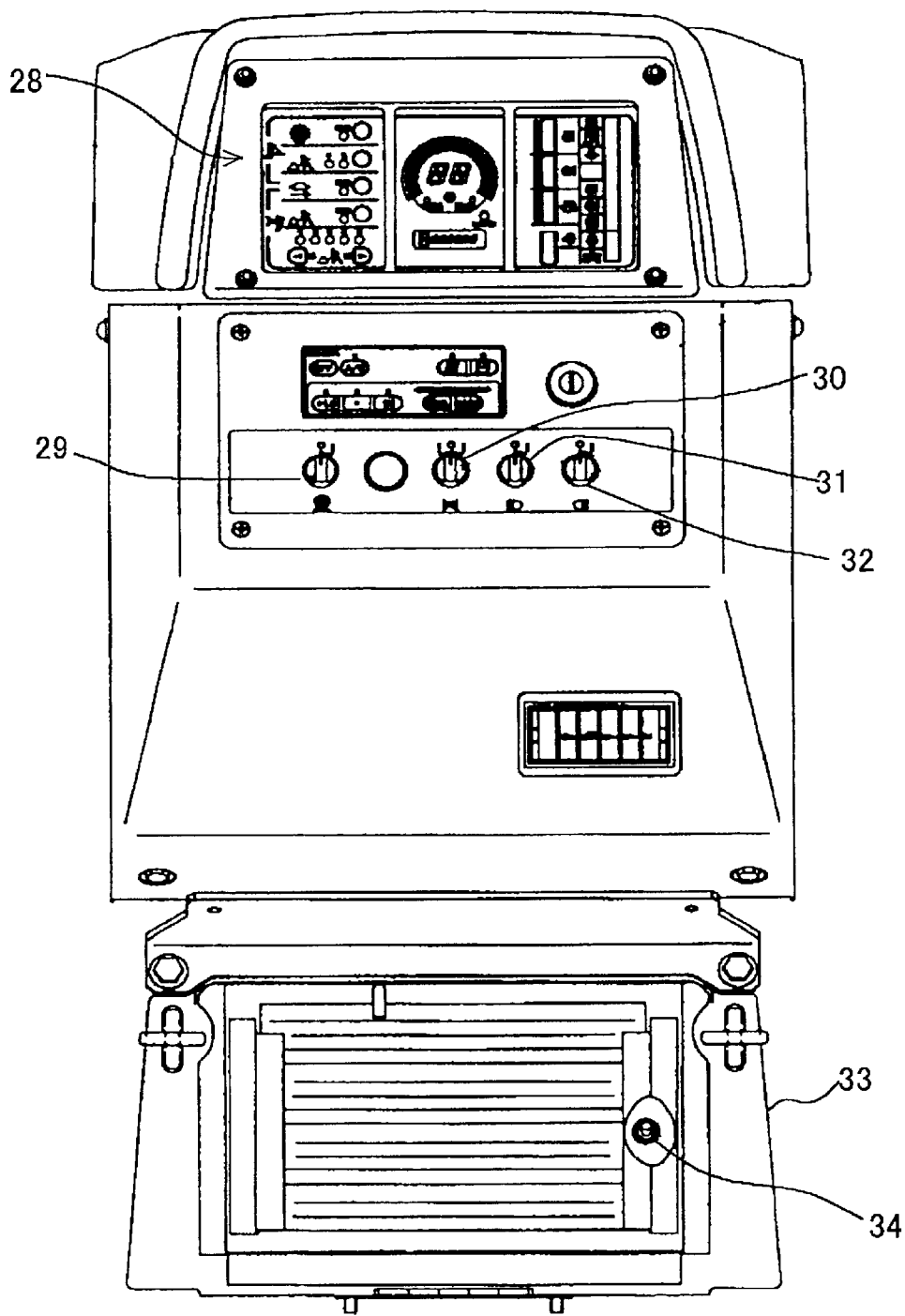
FIG. 7 shows a monitor panel and a wire diagram for switches installed in a cab.
Figure 8:
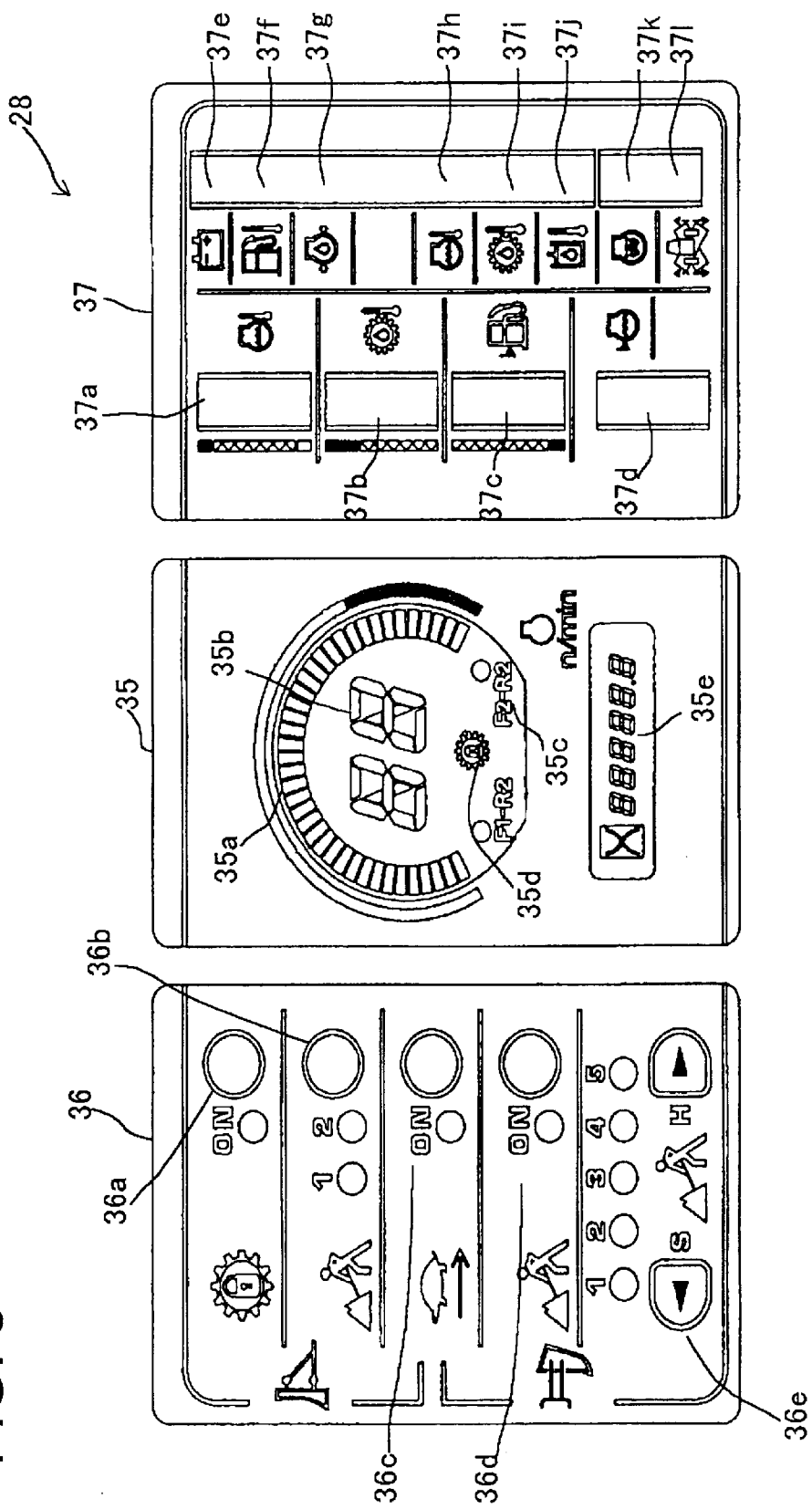
FIG. 8 is a detailed view of the monitor panel.

Next, the aforementioned setting process for the adjustment mode (see Step B in FIG. 3) will be more concretely described. FIG. 7 shows a monitor panel and wire diagram for switches installed in the cab of the bulldozer constructed according to the present embodiment. FIG. 8 shows a detailed view of the monitor panel.

As seen from FIG. 7, the touch-panel-type monitor panel 28 is installed in the front part of the cab, and various switches such as an automatic shift down switch 29, a buzzer canceling switch 30, a headlight switch 31, and a taillight switch 32 are provided under the monitor panel 28. Disposed under these switches is a service switch 34 which is located at such a position that an ordinary operator cannot operate the switch, that is, a position inside a cover 33 to which only an adjuster has access.

As shown in FIG. 8, the monitor panel 28 has a tacho module 35 at its center, a shoe slip control switch module 36 at the left hand, and a caution module 37 at the right hand. The tacho module 35 is comprised of a tachometer 35a, a speed range display 35b, a travel mode display 35c, a lock-up display 35d and a service meter 35e. The shoe slip control switch module 36 is composed of a lock-up switch 36a, an economy switch 36b, a backward drive slow switch 36c, a shoe slip control switch 36d, and a shoe slip mode switch 36e. The caution module 37 is composed of (i) gauges such as an engine water temperature gauge 37a, a power line oil temperature gauge 37b and a fuel gauge 37c; (ii) caution displays such as a radiator water level display 37d, a charged current amount display 37e, a fuel temperature display 37f, an engine hydraulic pressure display 37g, an engine water temperature display 37h, a power line oil temperature display 37i and a hydraulic fluid temperature display 37j; and (iii) lamps such as a glow lamp 37k and a dual tilt 37l.

Figure 9:
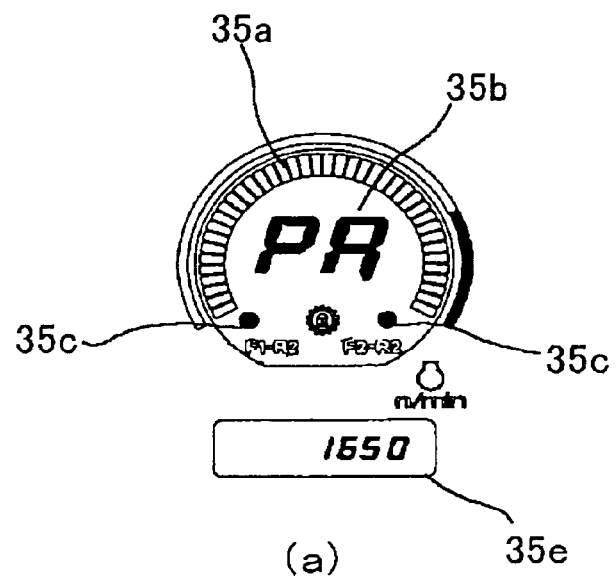
FIGS. 9(*a*) and 9(*b*) are views each illustrating a presentation displayed in an adjustment mode.
Figure 9:
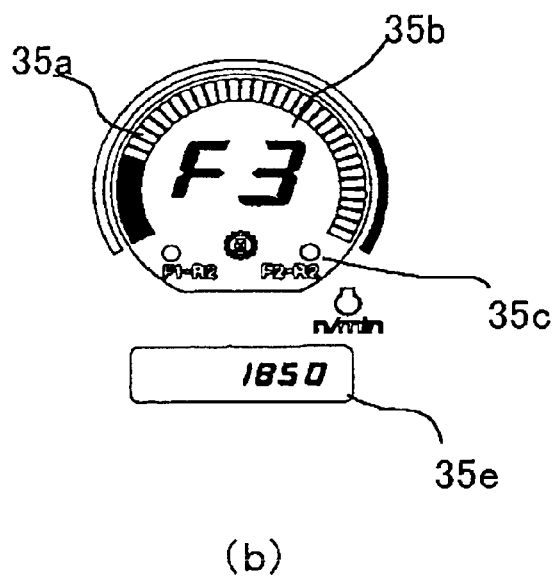

In this arrangement, when a normal operation is carried out (i.e., when a normal mode is selected), tacho gauge displaying is done by the tachometer 35a of the tacho module 35 provided in the monitor panel 28, the current speed range (F1, F2, etc.) is displayed in characters on the speed range display 35b, and service time is displayed in figures on the service meter 35e. In this condition, the adjuster turns on both the buzzer canceling switch 30 and the service switch 34 to select service modes. When a clutch adjustment mode, which is one of the service modes, has been set, the speed range display 35b is switched to its character displaying state to display "PE" as shown in FIG. 9(a), which indicates the clutch adjustment mode, while the travel mode display 35c is switched to its lighting state, indicating the adjustment mode. Further, the service meter 35e is switched to its figure displaying state to indicate a clutch hydraulic pressure command value (in the example shown in FIG. 9(a), the clutch hydraulic pressure command value indicated by the service meter 35e is 16.50 kg/cm$^2$).

Upon shifting of the speed range of the transmission 14 into the forward third speed (F3) (Step C of FIG. 3) after setting the adjustment mode, the speed range display 35b is switched from "PE" to "F3" as shown in FIG. 9(b) with the tacho gauge displayed on the tachometer 35a increasing with time during the adjustment while the clutch hydraulic pressure command value displayed on the service meter 35e automatically changing.

According to the present embodiment, the operations at Steps C and D are effected by the adjuster in the clutch adjustment process shown in FIG. 3. It is also possible to automatically carry out these operations by transmitting a control signal from the controller 20 to the right and left clutch solenoid proportional control valves 21R, 21L in response to an adjustment mode setting signal.

While the present embodiment uses the transmission output shaft rotation sensor 26 as the transmission output-side rotation sensor for detecting whether or not the clutch has started sliding, a bevel rotation sensor for the lateral shaft may be used as the transmission output-side rotation sensor.

While the clutch hydraulic pressure command value in the present embodiment is step-wise increased as shown in FIG. 5, the clutch hydraulic pressure command value may be continuously altered.

Although the clutches 16R, 16L of the present embodiment are designed to be engaged by the energizing force of springs and disengaged by hydraulic pressure, they may be engaged by hydraulic pressure. In this case, the clutch hydraulic pressure command value shown in FIG. 5 is controlled to be gradually decreased with time.

What is claimed is:

1. A clutch adjustment method adapted for use with a tracklaying vehicle wherein right and left drive wheels are each provided with a clutch and a brake and wherein clutch hydraulic pressure and brake hydraulic pressure are controlled by operation of an electrical power-assisted steering lever to allow a right or left turn of the vehicle, the method comprising the steps of:
   selecting an adjustment mode for adjusting the clutch hydraulic pressure to a proper value while both of the brakes are in their actuated state,
   detecting a command value for the clutch hydraulic pressure at a start of sliding of the clutch while the clutch hydraulic pressure is being gradually changed, and
   adjusting the clutch based on the detected command value.

2. A clutch adjustment apparatus adapted for use with a tracklaying vehicle wherein right and left drive wheels are each provided with a clutch and a brake and wherein clutch hydraulic pressure and brake hydraulic pressure are controlled by operation of an electrical power-assisted steering lever to allow a right or left turn of the vehicle, the apparatus comprising:
   (a) adjustment mode setting means for setting an adjustment mode for adjusting the clutch hydraulic pressure to a proper value, while both of the brakes being in their actuated state;
   (b) clutch hydraulic pressure changing means for controlling the clutch hydraulic pressure to gradually change when the adjustment mode is set by the adjustment mode setting means;
   (c) clutch sliding start detecting means for detecting a start of sliding of a clutch;
   (d) clutch pressure command value detecting means for detecting a clutch pressure command value at the start of sliding of the clutch if sliding of the clutch is detected by the clutch sliding start detecting means while the clutch hydraulic pressure being gradually changed by the clutch hydraulic pressure changing means; and
   (e) clutch hydraulic pressure correcting means for correcting the clutch hydraulic pressure to a proper value, based on the clutch pressure command value detected by the clutch pressure command value detecting means.

3. A clutch adjustment apparatus according to claim 2, wherein the clutch hydraulic pressure correcting means corrects the clutch hydraulic pressure based on the difference between a reference clutch pressure command value corresponding to a specified tractive force of the vehicle and the clutch pressure command value detected by the clutch pressure command value detecting means.

4. A clutch adjustment apparatus according to claim 2, wherein the clutch sliding start detecting means is a transmission output-side rotation sensor for detecting the rotation of the output-side of a transmission of the vehicle and wherein the adjustment mode setting means sets the adjustment mode such that the clutch to be unadjusted is disengaged at all times, when each brake is constantly actuated and the electrical power-assisted steering lever has been shifted to the side of the clutch to be adjusted.

5. A clutch adjustment apparatus according to claim 4, wherein the clutch hydraulic pressure correcting means corrects the clutch hydraulic pressure based on the difference between a reference clutch pressure command value corresponding to a specified tractive force of the vehicle and the clutch pressure command value detected by the clutch pressure command value detecting means.

6. A clutch adjustment apparatus according to claim 2, wherein the clutch hydraulic pressure changing means provides a step-wise increase in a specified amount in the clutch hydraulic pressure at specified time intervals, starting from a preset initial value.

7. A clutch adjustment apparatus according to claim 6, wherein the clutch hydraulic pressure correcting means corrects the clutch hydraulic pressure based on the difference between a reference clutch pressure command value corresponding to a specified tractive force of the vehicle and the clutch pressure command value detected by the clutch pressure command value detecting means.

* * * * *

UNITED STATES PATENT AND TRADEMARK OFFICE
CERTIFICATE OF CORRECTION

PATENT NO.    : 6,712,187 B2
DATED         : March 30, 2004
INVENTOR(S)   : Kazuyuki Suzuki et al.

It is certified that error appears in the above-identified patent and that said Letters Patent is hereby corrected as shown below:

<u>Title page,</u>
Item [30], Foreign Application Priority Data, replace "200" with -- 2000 --.

Signed and Sealed this

Sixth Day of July, 2004

JON W. DUDAS
*Acting Director of the United States Patent and Trademark Office*